United States Patent [19]
Harrell

[11] 4,390,878
[45] Jun. 28, 1983

[54] TWO RECEIVER NOISE LOGGERS

[75] Inventor: John W. Harrell, Duncanville, Tex.

[73] Assignee: Mobil Oil Corporation, New York, N.Y.

[21] Appl. No.: 222,101

[22] Filed: Jan. 2, 1981

[51] Int. Cl.³ .............................................. G08C 19/00
[52] U.S. Cl. .................................... 340/856; 181/103; 181/112; 369/32; 455/103
[58] Field of Search .................. 367/25, 28, 82, 76; 181/102, 103, 105; 340/856, 857, 860, 870.26, 870.18, 870.11, 870.01; 73/152; 370/11; 455/102, 103, 105

[56] References Cited
U.S. PATENT DOCUMENTS 4,114,721  9/1978  Glenn, Jr. ......................... 181/105

Primary Examiner—S. C. Buczinski
Assistant Examiner—K. R. Kaiser
Attorney, Agent, or Firm—C. A. Huggett; M. G. Gilman; J. F. Powers, Jr.

[57] ABSTRACT

Disclosed is a system for acoustic noise logging in a production well which includes up-hole components and down-hole components including at least two sonic detectors, the up-hole and down-hole components being linked together by a four-wire interconnecting means. In addition, the down-hole components include at least three additional parameter detectors. These additional parameter detectors may include a temperature detector, a conductivity detector and a location detector. The first of these detectors produces a frequency proportional to, for example, temperature. The second detector frequency modulates the temperature signal, for example, in response to location. The third detector amplitude modulates the signal depending on whether or not a conductivity threshold has been exceeded.

The foregoing permits simultaneous monitoring of a plurality of down-hole parameters simultaneously without the necessity for multiplexing and yet employs only a four wire interconnecting means.

10 Claims, 4 Drawing Figures

TWO RECEIVER NOISE LOGGERS

BACKGROUND OF THE INVENTION

The present invention relates in general to an improved system for logging a plurality of parameters in a production oil well, and in particular, it relates to a system for simultaneously providing an acoustic noise log, a temperature log, a conductivity log, and a location log in such a well.

Production oil wells, as opposed to most exploratory wells are cased with pipe sections. Production wells may produce from a plurality of locations and in such situations, a plurality of axially aligned casings may be used. Whether a production well has a single or a plurality of casings, however, the diameter of the bore hole is constricted by the casing or casings. When logging of various parameters is accomplished in such a well, four wire interconnect cable between the down-hole and up-hole components of the logging device is commonly employed. These four wires carry power from the up-hole components to the down-hole components and also carry signals from the down-hole to the up-hole components.

Among the parameters sought to be logged in production wells are acoustic noise with multiple hydrophones. (See U.S. Pat. No. 4,114,721—Glenn). Other parameters to be monitored are conductivity, temperature and depth. It would, of course, be possible to monitor each of these parameters separately. However, such an approach is time consuming and therefore costly. It would also be possible to monitor all of these parameters simultaneously by increasing the number of interconnecting wires, however, such an approach is not a practical solution because of the constraints in the bore hole diameter of production wells having a casing or casings therein. It would also be possible to simultaneously monitor each of these components by multiplexing techniques, however, such an approach requires the use of a substantial number of solid state devices in the down-hole tool. Since down-hole components are subjected to severe temperatures and pressures, such an approach greatly decreases the reliability of the resulting tool.

It would be desirable to provide a production logging system for monitoring a plurality of parameters in addition to acoustic noise with a small, compact down-hole tool without the use of multiplexing techniques.

It would also be desirable to provide such a system with the commonly employed four wire interconnecting cable between the downhole and uphole components.

SUMMARY OF THE INVENTION

The foregoing objectives are achieved by a disclosed system for acoustic noise logging of a production well which includes up-hole components and down-hole components interconnected by a four wire interconnecting means. The up-hole components include a power-supply and parameter receiving and indicating means. The down-hole components include a first sonic detector producing a first signal, a second sonic detector for producing a second signal, a temperature detector for producing a third signal, a depth detector, a conductivity detector and in one embodiment, a bottom hole detector. In accordance with an important aspect of the present invention the third signal is a frequency proportional to temperature, which signal is mixed with either of the first or second signals for transmission to up-hole components. The third signal is frequency modulated by the depth detector output, amplitude modulated by the conductivity detector output and interrupted when the bottom of the well is detected.

In accordance with an important aspect of the present invention, the temperature detector includes a temperature sensor and a variable frequency oscillating means responsive thereto. The aforementioned third signal is produced by the oscillating means and has a frequency which is proportional to the temperature in the well as determined by the temperature sensor. The third signal and the aforementioned second signal are mixed for transmission to the up-hole components wherein a filter means is provided for separating the second and third signals. In accordance with another important aspect of the present invention, the oscillating means is further responsive to the depth detector, the third signal being frequency modulated by the output of the depth detector for transmission to the up-hole components.

In accordance with still another embodiment of the present invention, the conductivity detector includes a means for modulating amplitude of the third signal whenever a particular conductivity threshold is exceeded.

Accordingly, by monitoring the first and second signals up-hole, an acoustic log of a production well may be obtained. Moreover, by monitoring the third signal, the temperature of any location in the well may be determined.

Finally, sharp variations in the frequency of the third signal are monitored which indicate changes in depth. Changes in amplitude of the third signal are also monitored up-hole which indicate that a conductivity threshold has been exceeded.

BRIEF DESCRIPTION OF THE DRAWINGS

The present invention will be more fully understood by reference to the accompanying drawings in which.

BRIEF DESCRIPTION OF THE DRAWINGS

Figure 1:
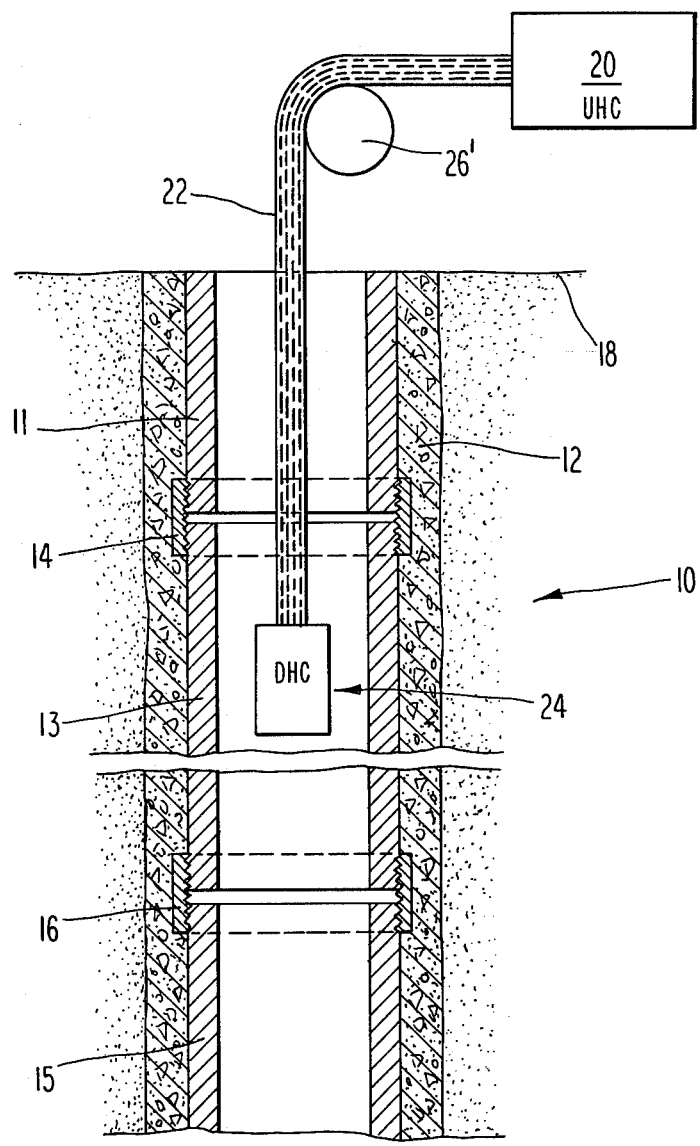
FIG. 1 illustrates an acoustic noise logging system of the present invention.

Referring now to FIG. 1, there is illustrated an acoustic noise logging system of the present invention. A well 10 traverses sub-surface formations. A plurality of well casing sections 11, 13 and 15 are cemented in place with a cement sheath 12. The well casing section 11 is joined to another well casing section 13 by means of a collar 14, theadedly engaged therewith. The well casing section 13 is also joined to a third well casing section 15 by means of another collar 16. Each of the well casing sections 11, 13 and 15 as well as others not shown, are of known length.

The acoustic noise logging system shown in FIG. 1, includes up-hole components 20 connected by means of a four wire interconnect means 22 to down-hole components shown generally at 24. The four wire interconnect means passes over a sheave 26' such that the down-hole components 24 may be moved through the well 10 to detect parameters at various locations therein. Since the casing sections are of known length, by determining the particular casing section at which the down-hole components are adjacent at any given time, the location at which parameters are detected may be precisely ascertained. The present invention accomplishes this result as will be described below.

Figure 2:
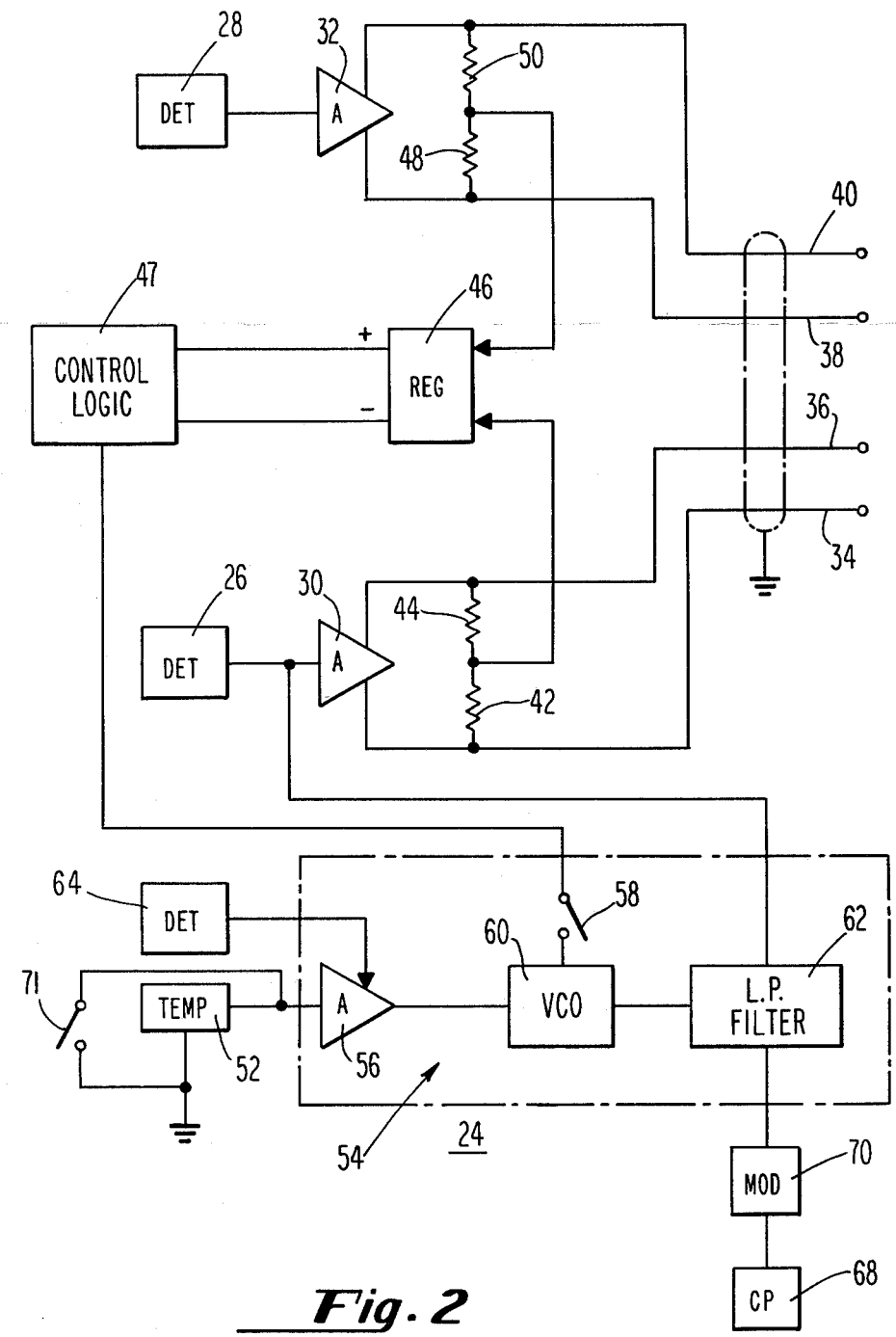
FIG. 2 is a block diagram of the down-hole components of the acoustic noise logging system shown in FIG. 1.

Referring now to FIG. 2, the down-hole components 24 will be described in more detail. As shown in FIG. 2, the down-hole components include a first sonic detector 26 and a second sonic detector 28. The sonic detectors may, for example, comprise Celesco LC-32 hydrophones. The sonic detectors 26 and 28 are spaced apart from one another as shown in U.S. Pat. No. 4,114,721—Glenn and are used, for example, to detect liquids flowing through openings in the casing system 11, 13, 15, etc. The first sonic detector 26 produces a first signal proportional to acoustic noise which is directed to a first sonic amplifier shown generally at 30 which conditions the signal for transmission to the surface. The second sonic detector 28 produces a second sonic signal which is directed to a second sonic amplifier shown generally at 32. The first sonic signal is directed from the first sonic amplifier 30 to the up-hole components by way of transmission lines 34 and 36 which comprise two wires of the aforementioned four wire interconnecting means 22. The second sonic signal is directed to the surface by way of transmission lines 38 and 40 which comprise the remaining two wires of the interconnecting means 22. Electric power for the operation of the sonic amplifiers 30 and 32 as well as other down-hole components is directed thereto also by way of transmission lines 34 through 40. The transmission lines 34 through 40 are shielded and grounded as shown. Connected across the transmission lines 34 and 36 are series resistors 42 and 44, the intermediate junction of which is connected to a voltage regulator 46 as shown. Also connected across transmission lines 38 and 40 are series resistors 48 and 50, the intermediate junction of which is also connected to a voltage regulator 46.

In accordance with an important embodiment of the present invention, the down-hole components further include a temperature detector which includes a temperature sensor 52 as well as a temperature-frequency converter circuit shown generally at 54. The temperature sensor 52 comprises a diode sensor which produces a voltage output proportional to the temperature in the well 10. The temperature-frequency converter circuit 54 includes an amplifier 56, a switch 58, a variable frequency oscillator 60 and a low pass filter 62. The output of the temperature sensor 52 is amplified by means of the amplifier 56 and is directed to the variable frequency oscillating means 60. The output of the oscillating means 60 is a third signal having a frequency proportional to the temperature in the well 10. This third signal may be directed by way of a low pass filter 62 to the first sonic amplifier 30 where it is mixed with the signal from the sonic detector 26 for transmission to the surface 18.

In accordance with an important aspect of the present invention, the down-hole components further include a depth detector 64. The depth detector 64 comprises a coil. As the down-hole components are moved through the well 10 a current is produced each time the coil passes collars 14, 16 and others. Since the length of casing sections 11, 13, 15 and others are known, by determining the number of collars traversed by the down-hole tool, an accurate indication of depth may be obtained. The current induced at the depth detector 64 is directed to the aforementioned amplifier 56 thereby varying the input voltage to the oscillating means 60. Accordingly, the third, or temperature signal, directed from the variable frequency oscillating means 60, is frequency modulated by the output of the depth detector 64.

In accordance with another important aspect of the present invention, the down-hole components further include a conductivity detector, the temperature detector being responsive thereto. The conductivity detector comprises a conductivity probe 68 as well as a means 70 for determining a conductivity threshold and for modulating the amplitude of the third signal whenever the conductivity threshold is exceeded. Accordingly, the amplitude of the third signal is modulated by the conductivity detector of the present invention.

The down-hole components 24 shown in FIG. 2 may also include control logic 47 connected to voltage regulator 46. Interruption of, for example, positive voltage to control logic 47 causes the operation of switch 58 in order for the system of the present invention to operate in a high resolution mode for temperature determination.

The down-hole components may also and preferably do include a bottom hole detector which indicates when the down-hole components 24 are at the bottom of the well 10. The bottom hole detector preferably comprises a switch 71 which shorts the temperature sensor 52 to ground when closed by physical contact with the bottom of the well. In such instance the aforementioned third, or temperature signal is interrupted.

Figure 3:
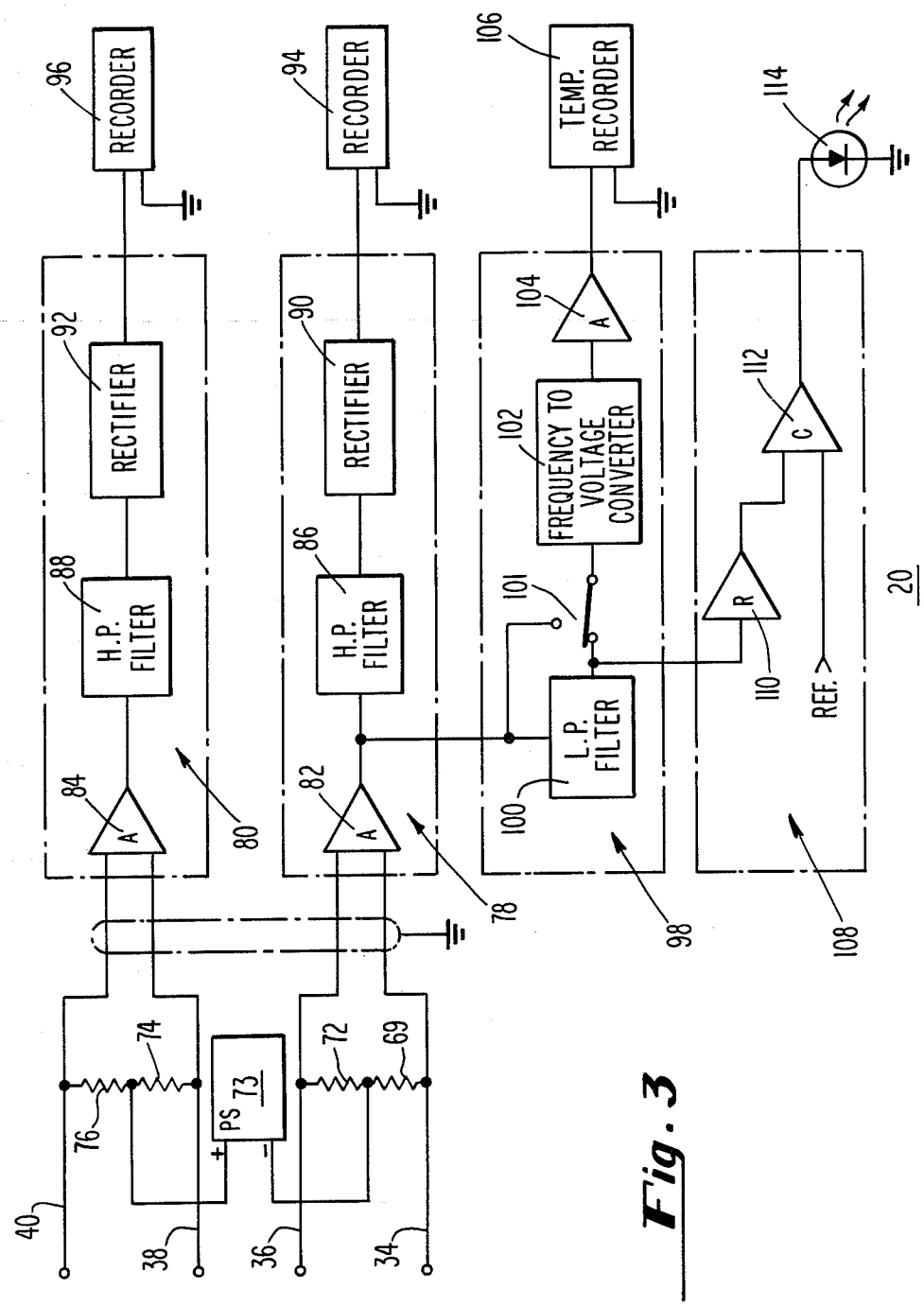
FIG. 3 is a block diagram of the down-hole components of the acoustic noise logging system of FIG. 1.

Referring now to FIG. 3, the up-hole component 20 of the system of the present invention will be more fully described. The up-hole components 20 include a power supply 73 for transmitting power across the four wire interconnecting means 22 to the down-hole components. The power supply includes a source of negative voltage applied across resistors 69 and 72 to transmission lines 34 and 36, respectively. A source of positive voltage is applied across resistors 74 and 76 to transmission lines 38 and 40, respectively. The up-hole components further include a plurality of parameter receiving means which will now be further described.

The up-hole components include a first circuit 78 for receiving signals from the first sonic detector 26 and a second circuit 80 for receiving sonic signals from the second sonic detector 28. Each of the circuits 78 and 80 include differential amplifiers 82 and 84 for common mode rejection and conversion of differential signals to a single ended source. Circuits 78 and 80 each include a high pass filter, 86 and 88 respectively, which pass frequencies above, for example, 500 Hz for display and analysis, which frequencies represent acoustic noise detected by sonic detectors 26 and 28. Finally, the circuits 78 and 80 each contain a rectifier 90 and 92 which converts the filtered sonic signals to a proportional DC signal required by recorder circuits 94 and 96.

In accordance with an important aspect of the present invention, the up-hole components 20 further include a temperature receiver circuit shown generally at 98. The temperature receiver circuit includes a low pass filter 100 which passes frequencies less than about 250 Hz. Connected to the low pass filter 100 by way of switch 101 is a frequency-to-voltage converter 102 which converts the aforementioned third or temperature signal to a voltage proportional to the temperature detected by temperature sensor 52. The output of the frequency to voltage converter 102 is directed to an amplifier 104 which provides full-scale temperature display to temperature recorder 106 for high resolution recordings. The switch 101 is utilized to bypass low pass filter 100 when the system of the present invention is in a high resolution mode with respect to temperature.

In accordance with an important aspect of the present invention, the temperature receiver circuit 98 is multifunctional in that large variations in the frequency of the temperature signal which is applied thereto produce large variations in output voltage which indicates that a collar 14, 16, etc. has been traversed by the down-hole components. This, in turn, gives an indication of the depth at which the temperature log is being taken at any given time.

In accordance with another important aspect of the present invention, a conductivity receiver circuit 108 is provided. The conductivity receiver circuit 108 includes a rectifier 110 to which the filtered temperature signal from the filter 100 is directed. The output of the rectifier 110 is then compared or vis-a-vis a reference at a comparator 112. If the reference is exceeded, it is concluded that any fluids being detected by sonic detectors 26 and 28 and recorded at the sonic recorders 94 and 96 are conductive, and therefore, not hydrocarbon liquids. Such an indication is provided by way of a conductivity indicating means such as a light emitting diode 114 as shown.

Figure 4:
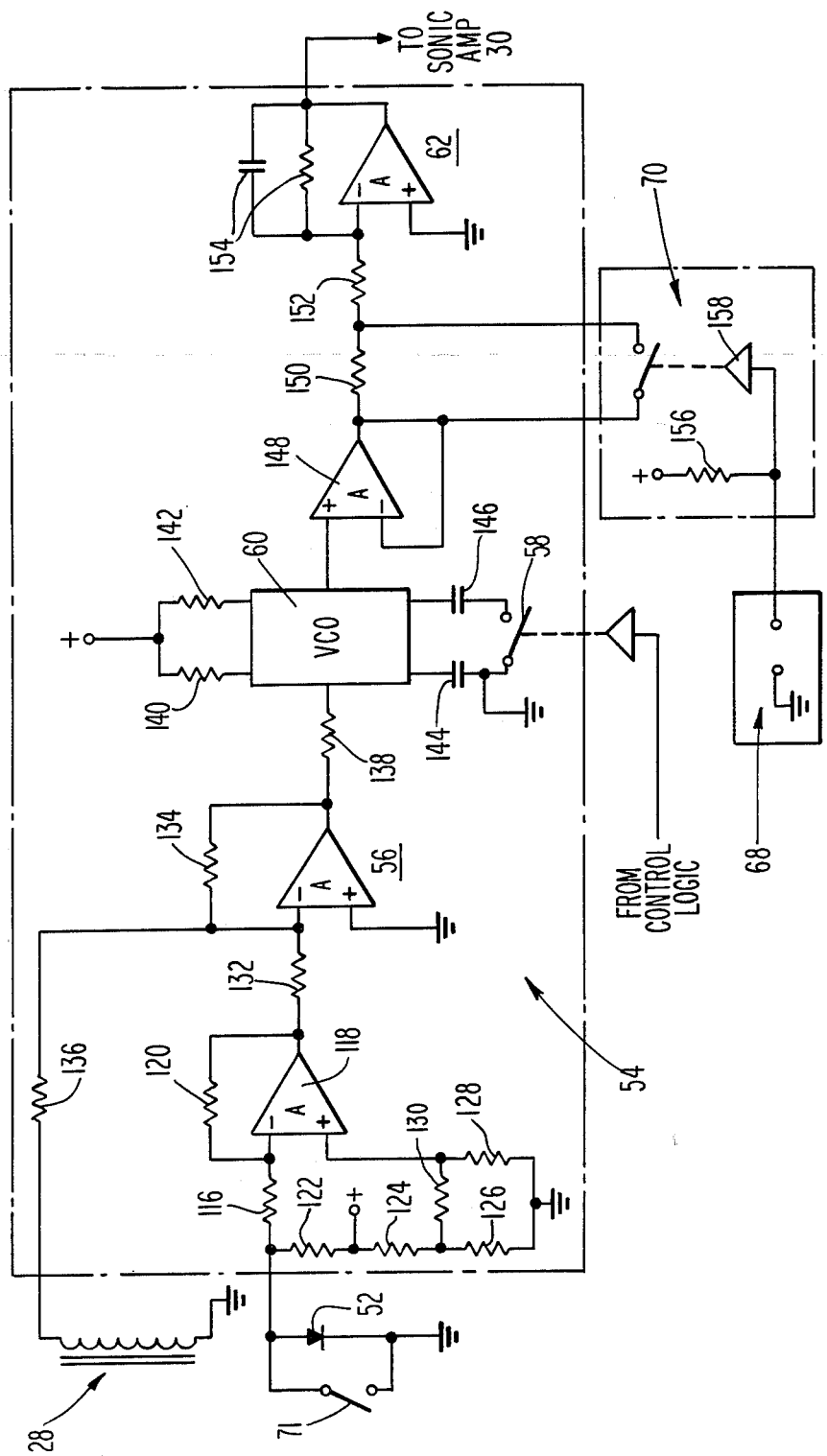
FIG. 4 is a schematic circuit diagram of down-hole components.

Referring now to FIG. 4, those down-hole components which produce the third or temperature signal, those components which amplitude or frequency modulate that signal or which interrupt it when the bottom of the well is detected will be described schematically. Referring to FIG. 4, the temperature sensor 52 will be seen. The temperature sensor comprises a temperature sensitive diode connected to ground. The output voltage across the temperature sensor 52 is directed to the temperature-to-frequency converter circuit shown generally at 54. As mentioned above, the temperature-to-frequency converter circuit includes an amplifier 56, a switch 58, a voltage controlled oscillator 60 and a low pass filter 62.

The output from the temperature sensor 52 is directed to the amplifier 56 through a differential amplifier 118 having an input resistor 116. The amplifier 118 includes a feedback resistor 120. The non-inverting input of amplifier 118 is connected to a resistor network including resistor 122, 124, 126, 128 and 130. The source of positive voltage is connected across resistors 124 through 130 to ground as shown. The output of differential amplifier 118 is directed to the inverting input of amplifier 56 by way of a resistor 132. The non-inverting input of amplifier 56 is connected to ground as shown. Amplifier 156 has a feedback resistor 134. The depth detector 28 comprising coil which is also connected to the inverting input of amplifier 56 by way of resistor 136. Amplifier 56 is a summing amplifier producing a voltage output proportional to the sum of the outputs of the temperature sensor 52 and the depth detector 28. The output of amplifier 56 is directed to the voltage controlled oscillator means 60 by way of a resistor 138. A source of positive voltage is supplied to the voltage controlled oscillating means 60 across resistors 140 and 142. The frequency response of the voltage controlled oscillating means 60 is determined by capacitors 144, 146 and the position of the switch 58. The switch 58 is a solid state switch, the position of which is controlled from control logic 47. With the switch 58 open, the temperature detector of the present invention operates in a low temperature resolution mode and with switch 58 closed in a high resolution mode. The output of the voltage controlled oscillating means 60 is a signal having a frequency proportional to the temperature at temperature sensor 52 which is frequency modulated by the output of the depth detector 28. This signal is directed to a buffer amplifier shown at 148 and from there is directed across series resistor combination 150 and 152. In the preferred embodiment, a low pass filter 62 is provided having an RC network 154 in the feedback loop thereof to remove low frequency harmonics. The output of the low pass filter 62 is directed to the first sonic amplifier 30 as mentioned above.

Also shown in FIG. 4 is conductivity probe 68 as well as a means 70 for amplitude modulation of the signal directed to the sonic amplifier 30. Means 70 includes a conductivity threshold which includes a resistor 156 connected between a source of positive voltage and conductivity probe 68. A solid state switch 158 is provided which shorts resistor 150 whenever a current at conductivity probe 68 exceeds a conductivity threshold determined by the current through resistor 156. Shorting resistor 150 increases the amplitude of the signal directed to the sonic amplifier 30 whenever conductive liquids are encountered by the down-hole tool.

Finally, as shown in FIG. 4, the bottom hole detector 71 includes a switch which is normally open but which closes when the down-hole components reach the bottom of the well 10. When such occurs, the temperature sensor 52 is shorted thereby interrupting the third or temperature signal.

Although the present invention has been described in connection with the preferred embodiment, various modifications and changes may be made without departing from the spirit and scope of the present invention as set forth in the appended claims.

What is claimed is:

1. In a system for acoustic noise logging in a production well including:
   up-hole components,
   down-hole components, the down hole components including at least two sonic detectors, said up-hole components and said down-hole components being linked together by four wire interconnecting means, the improvement comprising:
   additional down-hole components including:
      a first parameter detector, the output signal from which is a frequency proportional to a sensed first parameter;
      a second parameter detector having a means for frequency modulating said signal in response to a sensed second parameter; and
      a third parameter detector having a means for amplitude modulating said signal in response to a sensed third parameter.

2. The system of claim 1, wherein said first parameter is temperature, wherein said second parameter is location in said well, and wherein said third parameter is conductivity.

3. The system of claim 1 further including a fourth parameter detector having a means for interrupting said signal in response to a sensed fourth parameter.

4. The system of claim 3 wherein said fourth parameter is the bottom of said well.

5. A system for acoustic noise logging in a production well comprising:
(A) Up-hole components including:
  (i) a power supply
  (ii) parameter receiving means, and
  (iii) parameter indicating means; and
(B) Down-hole components including:
  (i) a first sonic detector for producing a first signal,
  (ii) a second sonic detector for producing a second signal,
  (iii) a temperature detector for producing a third signal,
  (iv) a depth detector having means for frequency modulating said third signal, and,
  (v) a conductivity detector having means for amplitude modulating said third signal; and
(C) A four wire interconnecting means for transmitting electric power from said up-hole to said down-hole components and for transmitting said signals from said down-hole to said up-hole components.

6. The system of claim 5 wherein, said temperature detector includes a temperature sensor and a variable frequency oscillating means responsive thereto, said third signal being produced by said oscillating means with a frequency proportional to the temperature detected by said temperature sensor, second and said third signals being mixed for transmission to said up-hole components and wherein;
  said parameter receiving means includes a filter for isolating said third signal from said second signal.

7. The system of claim 6 wherein said oscillating means is further responsive to said depth detector and wherein said third signal is frequency modulated by the output of said depth detector.

8. The system of claim 7 wherein means for amplitude modulating said third signal includes a means for increasing the amplitude of said third signal whenever a conductivity threshold in exceeded, and wherein
  said parameter receiving means further includes a means responsive to said filter for comparing the amplitude of said third signal against a conductivity threshold.

9. The system of claim 8 further including a bottom hole detector.

10. The system of claim 9 wherein said temperature detector is responsive to said bottom hole detector wherein said third signal is interrupted whenever the bottom of said well is detected by said bottom well detector.

* * * * *